US005723972A

United States Patent [19]
Bartol et al.

[11] Patent Number: 5,723,972
[45] Date of Patent: Mar. 3, 1998

[54] FAIL-SAFE COMMON CONTROL OF MULTIPLE ALTERNATORS ELECTRICALLY CONNECTED IN TANDEM PARALLEL FOR PRODUCING HIGH CURRENT

[76] Inventors: Luis E. Bartol; German Holguin, both of c/o Industrias Condor, S.A. de C.V. Blvd M. Cervantes Saavedra No. 17, Col Granada 11520, Mexico

[21] Appl. No.: 680,126

[22] Filed: Jul. 15, 1996

Related U.S. Application Data

[63] Continuation-in-part of Ser. No. 645,611, May 14, 1996, and Ser. No. 580,763, Dec. 29, 1995, Pat. No. 5,642,033.

[51] Int. Cl.$^6$ .................................................. H02P 9/00
[52] U.S. Cl. .......................... 322/15; 322/22; 322/28; 322/36; 307/10.7
[58] Field of Search ................................ 322/15, 22, 28, 322/36; 307/10.7

[56] References Cited

U.S. PATENT DOCUMENTS

| | | | |
|---|---|---|---|
| 4,045,718 | 8/1977 | Gray | 320/17 |
| 4,239,978 | 12/1980 | Kofink | 307/16 |
| 4,336,485 | 6/1982 | Stroud | 320/15 |
| 4,347,473 | 8/1982 | Stroud | 320/15 |
| 4,509,005 | 4/1985 | Stroud | 320/68 |
| 4,720,645 | 1/1988 | Stroud | 310/68 |
| 4,728,806 | 3/1988 | Baker et al. | 307/43 |
| 4,757,249 | 7/1988 | Farber et al. | 320/15 |
| 4,829,228 | 5/1989 | Buetemeister | 322/27 |
| 5,233,229 | 8/1993 | Kohl et al. | 307/10.1 |
| 5,254,936 | 10/1993 | Leaf et al. | 322/90 |

Primary Examiner—Steven L. Stephan
Assistant Examiner—Nicholas Ponomarenko
Attorney, Agent, or Firm—Fuess & Davidenas

[57] ABSTRACT

Two or more alternators—each typically of an economical cost and of any mixture of types and capacities—are turned by a single motive power source—normally the engine of a large commercial truck or bus. The several alternators are electrically connected in tandem-parallel across a battery/load. A corresponding number of electronic voltage regulators, preferably of the type described in patent application Ser. No. 08/645,611, respectively individually control the alternators. One electronic voltage regulator that is modified to become a designated master produces a "universal" control signal in response to variations in a voltage across the battery/load. This "universal" control signal is further used in the master electronic voltage regulator itself to develop a conventional signal providing regulation to an associated alternator. The same universal control signal is provided by wired connection to all remaining, preferably identical, voltage regulators, each of which is modified to become a follower voltage regulator. Each of the follower voltage regulators produces a signal for the regulation control of its associated alternator not by reference to the battery/load voltage (as would be normal), but rather by reference to the universal control signal. Failure malfunctions of one only alternator, or voltage regulator, do not cause either outage or runaway of the entire system, but instead only cause either reduced power generation capacity in the system or runaway in one only of the alternators. Triple alternator systems producing power to 480 amperes and more (typically at 12 v.d.c.), are routinely economically realized, and are reliably operated at reduced life cycle cost versus a single alternator-regulator system of similar capacity.

30 Claims, 3 Drawing Sheets

5,723,972

FAIL-SAFE COMMON CONTROL OF MULTIPLE ALTERNATORS ELECTRICALLY CONNECTED IN TANDEM PARALLEL FOR PRODUCING HIGH CURRENT

REFERENCE TO RELATED PATENT APPLICATIONS

The present patent application is a CIP of U.S. patent application Ser. No. 08/645,611 filed May 14, 1996, for a SINGLE-WIRE-CONNECTED HIGH-SENSITIVITY DUAL-MODE A.C./D.C TURN ON/TURN OFF STAGE FOR AN ELECTRONIC VOLTAGE REGULATOR, and also U.S. patent application Ser. No. 08/580,763 filed Dec. 29, 1995, now U.S. Pat. No. 5,642,033, for an OVERLOAD-PROTECTED AND REFERENCE-VOLTAGE-LOSS-PROTECTED ELECTRONIC VOLTAGE REGULATOR FOR VEHICULAR-TYPE ALTERNATORS THAT BOTH TOLERATES MOMENTARY HIGH FIELD CURRENTS AND SUPPRESSES LOW FREQUENCY NOISE. Both applications are to the same Luis E. Bartol and German Holguin who are co-inventors of the present application. These related applications, and this application, are in turn related to U.S. Pat. No. 5,325,044 issued Jun. 28, 1994, for an ELECTRONIC VOLTAGE REGULATOR PROTECTED AGAINST FAILURE DUE TO OVERLOAD, OR DUE TO LOSS OF A REFERENCE VOLTAGE to said Luis E. Bartol.

The contents of the related predecessor patent applications and patent are incorporated herein by reference.

BACKGROUND OF THE INVENTION

1. Field of the Invention

The present invention generally concerns improvements to voltage regulators and to alternators in general, and in particular concerns improvements to vehicular electronic voltage regulator and alternator combinations used in heavy duty, high current, applications, including the very highest current vehicular applications now extant anywhere.

The present invention further concerns fail-safe alternator electrical power systems, particularly for vehicles.

The present invention is generally applicable to all electronic voltage regulators and vehicular alternators, but—because of the design intent of providing fail-safe back-up power in the case of malfunction of any one alternator or any one voltage regulator (as long as at least one alternator and its associated voltage regulator remain operative) out of a number of both such—the improvements of the present invention are particularly useful for (i) revenue-generating vehicles such as trucks and buses, and (ii) emergency vehicles such as ambulances and fire-trucks. The fail-safe multiple-alternator power system of the present invention is intended to provide a vehicle enough electrical power to (i) safely return to base, (ii) continue in motion until emergency assistance can be procured, and/or (iii) maintain in operation critical or life-support equipment.

2. Description of the Prior Art

2.1 Commercial Vehicles Legitimately Require Large Capacity Alternator-Battery Electrical Systems Electrical power for vehicles including automobiles, trucks and buses is typically supplied by alternator-battery systems. Commercial vehicles operated for profit, most notably trucks and buses, are at present sometimes operated for prolonged periods, or even exclusively, in congested urban environments where significant electrical power must be produced by the alternator-battery system of the vehicle while the engine turns at a low speed.

The most significant use of this electrical power are the blowers for vehicular air conditioning. In order that noticeably stale odors should not accumulate in urban buses, in particular, it is typically necessary that about one hundred and forty amperes (140 amp.) at, nominally, twelve volts direct current (12 v.d.c.) should be provided for powering the air conditioning. The rotor shaft rotation rate of a bus's alternator is typically 1800–2000 revolutions per minute (1800–2000 r.p.m.) when, as is typical for a diesel engine, the idle speed of the bus is approximately 600 revolutions per minute (600 r.p.m.). At this shaft rotation speed, a typical alternator will typically produce only about sixty percent (60%) of its rated maximum output power.

Therefore, in order to handle the one hundred and forty amperes (140 amp.) air conditioning electrical load alone of an urban bus, an alternator of, typically, 233 amperes capacity would be required. Additional electrical loads on the bus would, of course, require an alternator of even greater capacity.

In actual fact, buses, and other vehicles, commonly do not have alternators of such capacity, but instead draw significant power from their batteries during heavy electrical loads at engine idle speeds. This power draw increases the necessary sizes of the batteries, with the attendant negative impact upon vehicle cost, weight, and operational cost. The constant heavy charge and discharge of the batteries also shortens their operational life.

As may well be imagined, the trade-off between alternator and battery power is made on economic grounds. If a reliable alternator system of higher current (power) capacity than is normal could be economically made, especially if of a lower weight than an equivalent battery, then such a high-capacity alternator might benefit both vehicle procurement cost and life cycle operational costs.

2.2 Alternator-Battery Electrical Systems Above a Certain Capacity Incur, Circa 1996, a Large Economic Penalty The cost of ever larger vehicular power systems, and particularly vehicular alternators, is not linear with larger alternator current capacities. In general, heavy duty vehicular alternators up to about 160 amperes capacity are most commonly used and as a consequence are the most cost-effective. The very largest alternators made—the Delco-Remy "50 DN"-class discussed in section 2.9 hereinafter, and like alternators with capacities between 250 and 300 amperes, and more—are exponentially larger, heavier and costlier (circa 1996) than are smaller capacity alternators. The "knee" of the alternator price-performance curve is thus approximately between 160 and 200 amperes.

The reason that alternators do not scale economically over a certain size is that (i) their semiconductors are not 100% efficient, (ii) their coil wires are not loss-less, and (iii) their bearings are not friction-less. All these elements convert the mechanical energy used to drive the alternator into heat. Moreover, when larger currents are carried, then the wires have to be of thicker gauge, making that the mass and size of the alternator is greater. The greater alternator mass and size increases the volume per unit surface area at which surface heat is dissipated, and causes the alternator to conserve internal heat and run hotter.

There therefore exist good and proper reasons, and strong evidence, based on thermal physics and the mechanics of materials as to why alternators of conventional, existing, designs and/or materials do not scale well over a certain size, and, instead, incur a times two (×2) and higher cost penalty per unit power output relative to smaller-sized alternators. As discussed in the next section, so many heavy duty alternators are made yearly worldwide that their high cost should not be seen to be a function of any lack of economies of scale.

2.3 Nonetheless to the Economic Penalty of Vehicular Electrical Systems Above a Certain Capacity, Demand for these Systems is Presently Growing For a number of possible reasons, the demand for vehicular electrical systems of greater than 160 amperes capacity is growing, even as the economic penalty for procurement of systems above this level has held level, or has slightly increased, for some years. It is an interesting question as to (i) whether the usage of electricity in heavy duty commercial vehicles first rose to the level of conveniently available supply and then proceeded to surpass this level, (ii) whether the vehicles became larger (such as tandem trailer trucks) and required their electrical systems to become larger in proportion, (iii) if the number and type of electrical appliances on heavy duty vehicles increased faster than any improvements in the energy efficiency of these appliances, (iv) if requirements of vehicle owners for electricity (especially for air conditioning blowers, electromagnetic brakes—called "retarders" in the trade—and for safety lighting) have grown greater, or (v) if some combination of these conditions has occurred.

Whatever the reasons, a large, and growing, number of vehicles are made worldwide each year that absolutely require vehicular electrical systems of capacities greater than are presently realizable cost-effectively in the 160 to 200 amperes range at the nominal 12 v.d.c. Moreover, there is some evidence that many new vehicles having electrical systems of lower capacity would beneficially be upgraded in amperage above approximately 160 amperes—primarily for the beneficial effect on the battery(ies)—if the economic penalties for doing so were not so great.

The present invention will shortly be seen to permit the ready assembly of vehicular electrical systems at 12 v.d.c. (or any other commercially desirable nominal voltage) and up to 300 amperes capacity, and more, at a significantly lower price penalty that has heretofore been incurred. Moreover, any future improvements in the cost effectiveness of alternator power generation in any range—low (below approximately 160 amperes), medium (160–200 amperes), or high (above 200 amperes)—will shortly be seen to be suitably incorporated within a system of the present invention, likewise improving the cost effectiveness of alternator power in these ranges, also.

2.4 Industry Solution Number One: Divide the Load

The first solution proposed by industry to alleviate the cost penalty of high capacity alternators has been to use two lower capacity, more economical, alternators on a single vehicle with each alternator servicing a separate load. Normally a first electrical system includes a battery, and includes all normal, electrical loads of the vehicle. The remaining, second load, and vehicular electrical system, does not normally contain a battery, and consists of the air conditioning blowers only. The vehicle electrical loads are normally split only into two portions because most of the vehicle's electrical loads other than air conditioning must be at least occasionally operative when the vehicle's engine is not turning, and must be on a battery system. Because it is not desired to incur the initial and life cycle cost of using two batteries, all battery loads are generally allocated to one alternator system.

One problem with such a split load system is that the air conditioning blowers tend to operate more slowly when the vehicle is stopped with the engine idling—exactly the opposite of what is desired to respond to the normal variations in heat load on the air conditioning system. A second problem is that the vehicle wiring may be more complex, extensive, weighty, and expensive. Finally, such two alternator systems are normally only installed in vehicles with extreme electrical power requirements, making that each alternator is commonly itself of high intermediate capacity, and more likely to be in the range between, at the low end, from 130 to 160 amperes (at a nominal 12 v.d.c.) to, at the high end, from 180 to 240 amperes (at a nominal 12 v.d.c.). Accordingly, the savings over a single gigantic alternator are accordingly less than if the loads could be divided even further, and even more alternators used.

The present invention will shortly be seen to permit the use of even more than two alternators, and the use of all such alternators in electrical tandem parallel to power but a single electrical power distribution bus that is normally also across the vehicle's battery.

2.5 Industry Solution Number Two: Tandem Parallel Alternators Matched in Voltage Output and in Temperature Compensation A second solution in partial alleviation of the cost penalty of high capacity alternators is made and sold by Robert Bosch and Company, Germany. This solution also employs two relatively cheaper alternators of relatively lessor capacity on a single (typically heavy duty, typically commercial) vehicle (typically a bus or a truck). Each alternator is controlled by an associated voltage regulator. The clear advantage of operating two alternators in tandem parallel is that both may operate to charge a single battery (or battery bank), and to power a single vehicular electrical power distribution bus.

However, considerable challenges are presented. The Bosch alternators need to be, and are, (i) identically constructed, and (ii) operated under identical conditions with the associated voltage regulators closely matched in (iii) voltage output and (iv) in temperature compensation. In fact, the preferred temperature compensation is negative, with a higher ambient temperature producing a lower output voltage.

Much more importantly in the Bosch system than the minor temperature compensation, and its associated variation in alternator output, is the need to keep the voltage outputs of the two alternators exactingly matched under all conditions of engine speed, electrical system load, and ambient temperature. Basically, if one alternator is, at any set of operational conditions, producing, say, 14.10 volts direct current (14.10 v.d.c.) while the remaining alternator is producing, say, 13.90 v.d.c., then the first alternator will supply the overwhelming majority of current into the jointly powered load. It will consistently run hotter, and will fail sooner.

Accordingly, in the Bosch system, the two alternators must be extremely closely regulated and require a special Bosch electronic regulator in order to be so closely co-regulated. Additionally, in order to compensate for the mismatch that naturally occurs when two alternators are operated in tandem parallel, both alternators have to be de-rated to a fraction (about 70%) of their nominal capacity. Whether from cost of engineering design, the need for de-rating or manufacturing construction or otherwise, the Bosch system is expensive, and is, to the best knowledge of the inventors, widely used only in Europe.

2.6 industry Solution Number Three: 24 V.D.C. Vehicular Electrical Systems

An alternator of a given size, and given size windings, will produce more net electrical power when operated at a higher voltage. This is because, by Ohm's law (V=IR) and by the fact that power is the product of voltage and current (P=VI), if the voltage (V) is raised then a wire can conduct more power for a given current (I).

Other factors make that the relationship between alternator voltage and power is not linear, but that an alternator will, for example, typically produce about 40% more power when operated at 24 v.d.c. as opposed to 12 v.d.c. This is not an inconsequential difference. An economical-cost alternator of 160 amperes capacity at 12 v.d.c. would be able to produce the 12 volt equivalent current of 224 amperes—well into the typically desired range—if it was to be operated at 24 v.d.c.

The reason why U.S. vehicles are typically operated on a 12 v.d.c. system appears to be based in history. Historically, vehicular light filaments suitable for use with 12 v.d.c. have been—because of their heavier and more robust wire size—more reliable than smaller filaments constructed for use with 24 v.d.c. Lighting systems are safety items in a vehicle, therefore the use of 12 v.d.c. systems for lighting purposes is mandatory in some states of the United States of America. Accordingly, the use of 24 v.d.c. systems is typically restricted to other types of loads such as air conditioning.

Also, because of the inertia of substantially the entire North American vehicle manufacturing and maintenance structure, 12 v.d.c. is strongly preferred for general vehicular use at the present time.

Some buses in Europe do use one hundred percent (100%) 24 v.d.c. power. Vehicles including buses have likewise been built in the U.S. that use 24 v.d.c. for the air conditioning, and 12 v.d.c. for the chassis. However, it should be recalled the use of 24 v.d.c., as opposed to 12, v.d.c. yields only an approximate 40% improvement in alternator power output, and thus does not constitute a complete solution for all high-power applications.

2.7 Industry Solution Number Four: Over-Idling

An alternator of any size will produce more net electrical power, within limits, when turned at a higher shaft speed. Alternators are generally and conventionally driven at ratios that will cause the alternator to turn as fast as it is able when the engine is operated at maximum r.p.m.

According to the fact that the alternator cannot be geared higher, the minimum speed of the engine to which the alternator is connected, and by which the alternator is driven, is simply maintained higher. This is called "over-idling". It is extremely wasteful of fuel energy. It is also unsafe, causing the vehicle to lurch forward (or backward) if the over-idling control sticks or jams during gear changes, or if the vehicle's drive is engaged while still over-idling at a standstill.

Insofar as over-idling is any sort of a solution at all, it is more commonly exercised under the volitional control of a vehicle's driver who may "race" the vehicle's engine in neutral so as to avoid, or minimize, battery discharge—especially if the battery is known to be weak, and/or the vehicle difficult to restart with a depleted battery. Thus over-idling also does not constitute a complete solution to deriving more power from an alternator or alternators at low cost.

2.8 Industry Solution Number Five: The Big Voltage Regulator

Another possible solution to producing high current with several cost-effective alternators (i) operated in a tandem parallel connection to (ii) supply power to a single battery-load system might be hypothesized to be a single large voltage regulator that would be capable of controlling the cumulative field currents of the parallel-connected alternator field windings.

This single large voltage regulator would be the only control device in the system. Therefore, if it fails then the vehicle's entire electrical generating system will typically either (i) shut down—if the regulator fails in an electrical open circuit—or (ii) try to run away—if the regulator fails in an electrical short circuit. Also, should one or more alternators become disengaged because of breakage in the drive belts, then the single voltage regulator would tend to compensate for the loss of power by driving more current through the field windings. Those field windings that remain motionless, will be unable to dissipate the heat generated in the field structure and therefore will have a tendency to prematurely and irreversibly be damaged. Finally, this system can only safely produce back-up power when one or more (but not all) field winding circuits fail as an electrical open circuit.

From the above discussion, it follows that system reliability is significantly compromised by internal and/or external factors, therefore, again, a single large voltage regulator does not seem to be a complete solution to deriving more power from an alternator or alternators at low cost.

2.9 Industry Solution Number Six: The Big Alternator

As previously alluded to, brute force solutions to producing more electrical power in and with an alternator certainly do exist. The "50 DN" heavy duty alternator line of Delco Remy, a U.S. manufacturer, is replete with alternators to 300 amperes capacity, and more. A "50 DN" alternator of 300 amperes capacity retails for a nominal of 3.3 times more per ampere than the 160 amperes capacity alternator, circa 1996. It weights approximately 100 lbs. as opposed to, for example, the typical 25 lb. weight of a typical 160 ampere alternator. Commensurate with its great weight (in excess of U.S. Occupational Safety and Health Administration (OSHA) single person lift standards) and its typical mounting with restricted access, these massive alternators are as difficult and expensive to work on as is the rest of the generally huge vehicles of which they typically form a part.

Although it may well be expected that optimum performance in alternators, as in anything else, comes at a high initial procurement price, the life cycle cost of ownership of a very large capacity alternator should also be duly regarded. Although the inventors are not privy to the reliability, nor the comparative reliability, statistics of very large alternators from different manufacturers, certain things can be said. In the first place, an alternator is a serial reliability element for the continued operation of the vehicle in which it is installed. This means that the failure of a vehicular alternator (or voltage regulator) generally renders the vehicle in which the alternator or voltage regulator is installed inoperative, at least (generally) after just a few miles operation on battery power (dependent upon electrical load and battery charge and capacity).

The largest capacity alternators are difficult to get repaired just anywhere along the U.S. interstate highway system, and/or at any time of the day or night. Accordingly, problems with a big alternator can be, and often are, big problems—irrespective of the cost of repairs. Repairs may simply not be available expediently, or locally, due to lack of parts, or of specialized service capacity, or both.

3.0 Critical Vehicular Power

Some of the vehicles that have the most critical requirements for electrical power also have very large electrical power requirements. These vehicles include, in civilian applications, ambulances, fire trucks and police cars and, in military applications, military vehicles and tanks.

Fail-safe electrical power in a vehicle is desirable for its own sake. It may well be imagined that, for example, vehicles used in wilderness and/or in poorly supported areas (which include extensive road tracks in the third world) would desirably not be disabled by any single failure of one alternator or one voltage regulator. It should also be understood that the mission effectiveness of many emergency and military vehicles depends on the continuous availability of electrical power, and these vehicles accordingly have very reliable, and typically very expensive and expensively maintained, electrical systems.

From the preceding discussion, it is thus clearly obvious, commensurate with the statements at the very beginning of this section, that, although the demand for large capacity and/or reliable vehicular electrical systems (including alternators) is currently increasing, both the (i) economies, and the (ii) fail-safe reliability, of very large capacity vehicular electrical systems are wanting. These problems are to a certain extent disguised because large and/or specialized vehicles—such as may typically have large capacity and/or ultra-reliable electrical systems)—have unique, and uniquely effective, characteristics. Large trucks in particular offer such an increased efficiency of driver labor as generally outweighs the difficulties of ownership and Operation, including repairs to the truck and specifically including expensive repairs to its high capacity alternators.

However, everything is clearly not optimal in this area. It is only necessary to have a $100K truck out of service en route to its destination for a twenty-four hour delay—in order to secure and replace a high capacity alternator—to appreciate that some better solution(s) to the vehicular power problem would be highly useful.

The present invention will immediately next be seen to, hopefully, fit quite well with the existing realities of the diverse world of vehicles, and of vehicular power systems.

SUMMARY OF THE INVENTION

The present invention—which has been fully and thoroughly tested by its inventors—contemplates deploying any number of completely conventional and unaltered commonly-driven alternators of any sizes or mixture of sizes whatsoever—but most normally each of some economical size that is presently (circa 1996) of approximately 160 amperes or less capacity—in electrical tandem parallel. Each alternator is controlled by an associated electronic voltage regulator that is also, typically, of a very nearly conventional, and only but very slightly altered, design. The several slightly altered voltage regulators as are individually associated with each of the several tandem alternators are principally distinguished by being organized, and electrically connected by a single low-level signal wire, as (i) one single master voltage regulator, that serves to control (ii) any number of wire-connected follower voltage regulators.

In their parallel, coherently-regulated, configuration each alternator contributes power to a common battery/load in accordance with its capacity. The several tandem alternators need not be of the same capacity.

The present invention further contemplates a fail-safe power system for producing electrical power from a source of motive power, particularly a vehicular power system using a number of electrically-parallel-connected alternators—each with an individually associated voltage regulators—to produce electrical power from the motive power of the vehicle's engine. The system is very, very, substantially fail-safe. The preferred power system is fail safe against each of (i) outage of any one alternator, (ii) runaway of any one alternator, (iii) failure of any electronic voltage regulator such as causes outage of an associated alternator, (iv) failure of any electronic voltage regulator such as causes runaway of an associated alternator, and even (v) standstill of a single alternator as is most commonly associated with a broken drive belt. In the case of an outage of any one alternator, howsoever caused, all other alternators remain operative and contribute to satisfying the system electrical load. In the case of a runaway of any one alternator, howsoever caused, all other alternators remain normally operative and contribute to satisfying the system electrical load if any such remains.

1. Multiple Alternators Connected in Electrical Tandem Parallel

Each of a number of alternators electrically connected in tandem parallel is controlled by an associated electronic voltage regulator. The collective voltage regulators are organized as (i) one single master voltage regulator, serving to control (ii) any number of wire-connected follower voltage regulators. Each electronic voltage regulator may be physically integrated into its associated alternators, or may be remotely located from its associated alternator. The choice depends on practical reasons or particular preferences of the electrical system designer.

The invention is therefore embodied, in one of its aspects, in (i) such modifications to each of several electronic voltage regulators as do subsequently permit an electrical interconnection of these voltage regulators, and in (ii) the interconnection of the several electronic voltage regulators so modified. The (i) modifications and (ii) interconnections, jointly, permit that the several interconnected modified voltage regulators suffice to control a corresponding several tandem alternators connected in electrical parallel so as to charge a single battery (or battery bank), and/or so as to power the load(s) on a vehicular electrical power distribution bus.

The (i) alterations to each of the several electronic voltage regulators are in the order of selecting, by hard-wired design, whether the voltage regulator is to regulate in response to, in the case of a selected single master voltage regulator, (1) a voltage sensed across the battery and/or load, or, in the case of all other, remaining, voltage regulators that are designated as followers, (2) a control signal as is received from the (selected single) master voltage regulator (whereat it was normally and routinely developed). This "universal" control signal is, in fact, a signal that the master voltage regulator further uses for the development of its own (normal, standard) output signal by which it effects (normal, standard) regulation control of its own (individually uniquely) associated alternator. The (ii) interconnection of the voltage regulators is thus a simple matter of routing a single wire, from the master voltage regulator to each follower, voltage regulator.

The invention is thus very simple, and, arguably, very elegant. Only one single "universal" control signal needs to be, and is, routed, and shared, between several voltage regulators in order to accomplish the coordinated control of several corresponding alternators (which need not be identical alternators, nor even alternators of identical capacity, nor even rotating at the same speed, etc., etc.) that are connected in tandem parallel across the battery/load.

However, the choice of, and the manner or electrically developing and communicating, this "universal" signal was made with great care, and with great discrimination, in order to effectuate not only joint control of alternators but also a fail-safe joint control, of which more will be discussed later. It should be understood that, once the principles of the present invention are understood, a number of different "control" signals developed in any of several places within a one, "master", voltage regulator may be beneficially communicated to, and used in, other voltage regulators serving to control other alternators electrically connected in tandem parallel. The basic, or core, scope of the present invention should therefore not be limited by the particular "universal" control signal that is developed and distributed, but by the inventor's realization that multiple electronic voltage regulators may be appropriately interconnected so as to suffice to control corresponding multiple alternators connected in tandem parallel to supply power to a common load in the first instance.

In the preferred embodiment of the invention, each alternator is controlled to contribute current to the power system in accordance with its capacity, and in accordance with system requirements. For example, if a vehicular power system comprising three alternators, two alternators each of 160 amperes capacity and a third alternator of 130 amperes capacity—for a total installed current capacity of 450 amperes—was to require 280 amperes current, then each alternator would be controlled to produce current so the total current requirement will be shared by the three alternators in a manner that each alternator will contribute proportionately to its own capacity.

Per the discussion of the cost effectiveness of differently sized alternators contained in the BACKGROUND OF THE INVENTION section of this specification, and in accordance with the present invention, tandem parallel alternator power systems of impressive capacity (i.e., 3 times 160 amperes), and more—as are particularly useful for heavy duty commercial vehicles—can be realized economically.

2. Fail-Safe Operation

Less obviously, a system so realized in accordance with the present invention has a life cycle cost that is much improved over present vehicular power systems. The failure of one alternator or, much less frequently, one voltage regulator, does not render the entire power system inoperative. If, in the example of the previous paragraph, the 130-ampere alternator was to cease to produce current—i.e. because of alternator failure, or breakage of the drive belts—then the system load could be and would be taken up by the remaining, still functional, alternators (to the level of their cumulative operating capacities). In vehicular applications, the driver of the vehicle can often reduce the electrical load upon the incipient occurrence of an electrical power system failure until he/she can "limp in" for repairs, which can most often be readily accomplished with routinely available, completely "mainstream" technology, service and parts.

By virtue of its redundant components, a power system in accordance with the present invention is thus of superior reliability, maintainability, and operability. This is true nonetheless that the power system is comprised of alternators (permissively of any of diverse type) that are substantially standard, and of electronic voltage regulators that are likewise substantially similar to existing electronic voltage regulators. The electronic voltage regulators of the present invention are but existing voltage regulators (of diverse type) modified in a manner not substantially effecting reliability. Indeed, the most important reliability element added in the system of the present invention is the connective wire and its associated terminals, and provision is made that these system elements should be both robust and highly reliable (per best current practices for vehicular electrical systems).

3. Exemplary Embodiments

Accordingly, in one of its aspects the present invention is embodied in a power system for producing electrical power from a source of motive power. The power system includes a battery and two or more alternators, each of which alternators has field windings and each of which alternators is connected in parallel across the battery. Each alternator is individually responsive to an associated control signal that, being inter-operative with the output stage of its associated voltage regulator, will drive its field winding to produce electrical power (as is routine for the control of an alternator).

In accordance with the present invention, a number of electronic voltage regulators, respectively individually control the like number of alternators. One electronic voltage regulator is modified so as to become a designated master electronic voltage regulator, and thereafter serves to produce a first control signal in response to variations in a voltage across the battery/load. This first, "universal", control signal is preferably and suitably associated with a small, but sophisticated, fail-safe electronic circuit resident in the master voltage regulator. This "universal", control signal is further used in a first, master, voltage regulator to develop the (conventionally pulse-width-modulated) signal by which regulation of an associated alternator is effected.

However, in accordance with the present invention, this same first "universal" control signal is also, further, supplied by wired connection to all remaining, identical, voltage regulators, which are modified to become designated follower voltage regulators. These remaining, follower voltage regulators, use the first, "universal", control signal for controlling associated ones of the plurality of alternators, not by reference to the battery/load voltage, but rather by reference to this first "universal" control signal. This use of a "universal" control signal developed in the master voltage regulator is why the remaining voltage regulators are spoken of as being "follower", voltage regulators.

The "universal" control signal is routed by simple, robust, reliable, wired interconnection between the several voltage regulators. (No appreciable current is transmitted).

4. Applications of the Basic System, and Preferred Construction

The power system so constituted is suitable for, and, indeed, intended for, use on a vehicle. Each of the electronic voltage regulators is preferably of a modern type producing a pulse-width-modulated control signal. Each of the electronic voltage regulators is more preferably (but need not be) of the type taught within related patent application Ser. No. 08/645,611 which in turn is related to patent application Ser. No. 08/580,763 and U.S. Pat. No. 5,325,044. This preference is because both the related U.S. Patent and patent applications teach certain design techniques related to overload protection that when incorporated into heavy duty, vehicular electronic voltage regulators, render parts of unusually high reliability, typically five to tenfold better than that of other, less advanced designs. Also, related patent application Ser. No. 08/645,611 teaches certain design techniques for the turn-on/turn-off of electronic voltage regulators that permit a simple, reliable and flexible control of the autonomous turn-on/turn-off function of the alternators associated with the improved voltage regulators.

These advanced voltage regulators serve, when adapted to the tandem-parallel alternator system of the present invention, to produce a cost-effective and reliable system. Remarkably, and although the system is reliable in its many different forms as use regulator-to-regulator "universal" control signals of many different origins, great care has been taken to (i) develop, (ii) distribute and (iii) use a particular "universal" control signal that moves the composite power system beyond mere high reliability, and, indeed, accords it very, very substantial fail-safe operation.

5. The Fail-Safe System

In another of its aspects, the present invention can be considered to be embodied in a fail-safe method of operating several electrical alternators to collectively produce more electrical power than would one alternator. In the fail-safe method, the several electrical alternators are electrically connected in tandem parallel across a battery/load. A voltage appearing across the battery/load is sensed. A first, single, master electronic voltage regulator is used to produce a universal control signal in response to the sensed voltage. This universal control signal is used in the master electronic voltage regulator itself to produce a further signal by which an associated one of the several electrical alternators is controlled to produce current into, and voltage across, the battery/load.

Meanwhile, and in accordance with the invention, the master control signal is routed to one or more follower electronic voltage regulators, and is therein used to control the associated, remaining, one(s) of the electrical alternators (which are connected in electrical parallel) to contribute to the production of the same voltage (across the same battery/load).

In accordance with the basic aspect of the present invention, the power generated by the multiplicity of associated pairs alternator-voltage regulator ("pairs") is cumulatively applied across the common battery/load, with each pair contributing power to the common battery/load in proportion to its individual capacity, at any one set of prevalent, operating conditions.

However, and further in accordance with the present invention, this parallel power system is fail safe. In case of failure of any one pair, the particular preferred master control signal will, by interacting with features built into the associated voltage regulators, act to try to isolate and correct the problem(s) caused by the failed pair. In the vast majority of real-world failure modes of the failed pair, the remaining, operating, pair(s) will be capable of delivering power to the battery/load at the original voltage setting and with a current capacity equal to the cumulative current contributed by all remaining, functional, pair(s)! This is, of course, a true "fail-safe" operation.

If the failure was caused by a pair going open—typically caused by a broken drive belt—then (i) the remaining, working, pair(s) will still track the original voltage setting and each pair will contribute current to the battery/load up to its individual capacity at the prevalent, operating conditions (principally speed of rotation and magnitude of the common load) and (ii) the control signal interacting with a turn-on/turn-off feature built into each and every associated voltage regulator—i.e. according to the teachings of U.S. patent application Ser. No. 08/645,611, or any other suitable scheme—will act to turn off the field winding of its associated alternator (to avoid thermal damage), thus effectively isolating the failed pair from the power generating system.

If the failure was caused by a pair with a runaway condition (or "full-field" as is known in the trade), typically caused by a shorted voltage regulator, then, the remaining, working, pair(s) will still track the original voltage setting and will adjust their current contribution to the battery/load in order to maintain the original voltage setting. If (i) the common load is sufficiently small, then, the runaway pair will be the only contributor of current to the battery/load, with the remaining, working, pair(s) shutting themselves off (thus the uncontrolled, runaway condition will be isolated to a single, failed pair) or if (ii) the common load is sufficiently large then each remaining, working, pair(s) will contribute current to the battery/load up to its individual capacity at the prevalent, operating conditions. Therefore, the same, modified voltage regulators—built according to the teachings of U.S. Pat. No. 5,325,044 and U.S. patent application Ser. Nos. 08/580,763 and 08/645,611 or to any other suitable specifications—can and indeed will be shown to be modified so that they not only serve to control their associated alternators in lock-step with a universal control signal (generated within the single, master voltage regulator) but so that they will cumulatively act to try to isolate and to compensate for any problem(s) caused by any one, or a number—but not all—failed pairs. These modified voltage regulators will even act to turn off their associated alternators to avoid a runaway condition in case of a loose, corroded or broken ("universal" control signal) control wired connection, thus effectively implementing a fail-safe function for the overall power generating system.

It will thus be taught that the preferred embodiment of the present invention, shown in the followings drawings and described in the accompanying specification, accomplishes each of the functions of: (i) isolation of failed pair(s), (ii) compensation for consequences of failed pair(s) and (iii) fail-safe operation in case of potential catastrophic system failure(s). All this is realized by using but one single signal communicated upon but one single, wired, connection, between the master and each of the follower, voltage regulators.

Many variations and embodiments of the present invention—such as "B"-type "core" voltage regulators, "A" or "B"-types "core" voltage regulators incorporating bipolar power transistors, operation in a voltage system other than the nominal 12 volts nominal described, etc., etc.—were successfully tested by the inventors. In general, most modern "core" voltage regulators could be modified to incorporate part or all the features of the present invention, be they constructed from discrete, or from integrated, components.

These and other aspects and attributes of the present invention will become increasingly clear upon reference to the following drawings and accompanying specification.

DESCRIPTION OF THE PREFERRED EMBODIMENT

Figure 1:
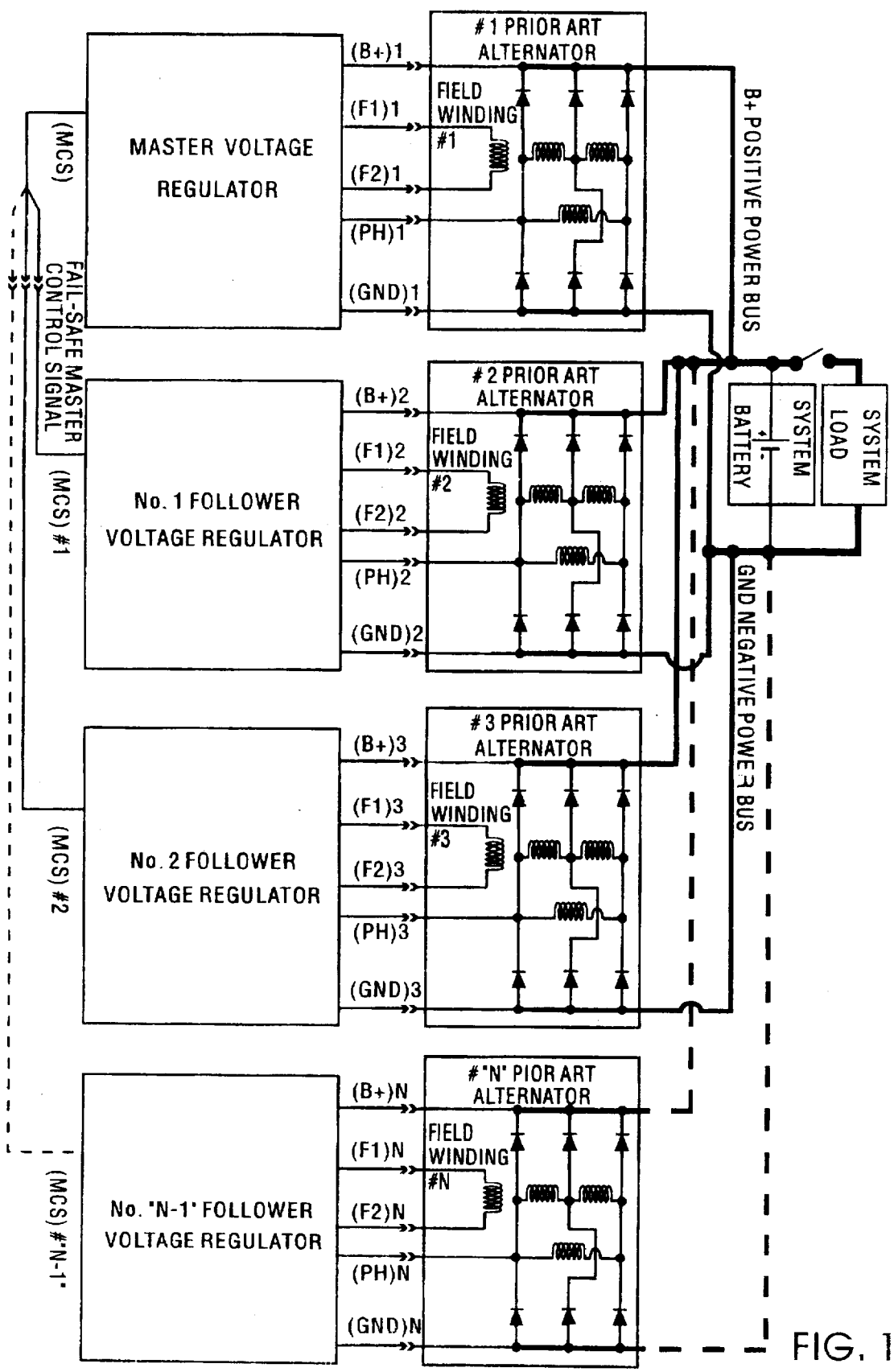
FIG. 1 is a block diagram of a tandem-parallel-connected, multiple alternator electrical system which supplies current to a common battery (or battery bank) and a common load, where each (prior art) alternator is controlled by an associated voltage regulator—one of which voltage regulators is a master controlling by wired connection all others as followers—in accordance to the present invention.

1. Construction and Operation of an Electrical System Comprised of "N" Prior Art Alternators Connected in Tandem Parallel and Delivering Power to a Common Load and Common Battery (or Battery Bank), each Alternator Controlled by an Associated Voltage Regulator, According to the Present Invention In reference to FIG. 1, a multiplicity of prior art alternators are connected in tandem parallel across a common battery/load. Each alternator is controlled by an associated voltage regulator—one of which regulators is a master, controlling by wired connection all others as followers—in accordance to the present invention.

First consider the standby condition in which the prior art alternators (labeled "#1", to "#N" in FIG. 1) are turning and therefore, as taught in patent application Ser. No. 08/645,611, their associated voltage regulators, both the single master and the several follower voltage regulators, will be turned-off and no current will flow through the field windings of the alternators.

Now consider the case when the engine is started and the alternators begin to turn (because of the mechanical link to the engine). Under this condition, as taught in patent application Ser. No. 08/645,611, a small voltage induced in each of the phases of every one of the alternators will serve to turn on (through terminals labeled "(PH)1" to "(PH)N") every one of the associated voltage regulators, allowing regulation to begin.

The master voltage regulator senses the system voltage across the single battery/load through terminals labeled "(B+)1" and "(GND)1" and regulates its associated, prior art alternator (labeled #1 in FIG. 1), according to a first control signal routinely generated by the master voltage regulator. This first control signal, suitably associated with a fail-safe circuit, becomes the master control signal (labeled "MCS" in FIG. 1) which is distributed by wired connection to all other, identical, follower voltage regulators. These several, follower voltage regulators subsequently use the master control signal (received at terminals labeled "(MCS)#1" to "(MCS)#N-1") in FIG. 1) for controlling their associated alternators, not by reference to the battery/load voltage, but rather by reference to the master control signal.

Consequently, the power generated by the plurality of tandem-parallel-connected prior art alternators is coordinately and cumulatively applied across the common battery/load with each alternator contributing power to the common battery/load in proportion to its individual capacity, at any one set of prevalent operating condition.

Because of the features built into the single, master and the several, follower, voltage regulators, failure of one only alternator, or one only voltage regulator, does not cause outage or runaway of the entire system, but only causes either reduced power generation capacity in the system or runaway in one only of the alternators.

Figure 2:
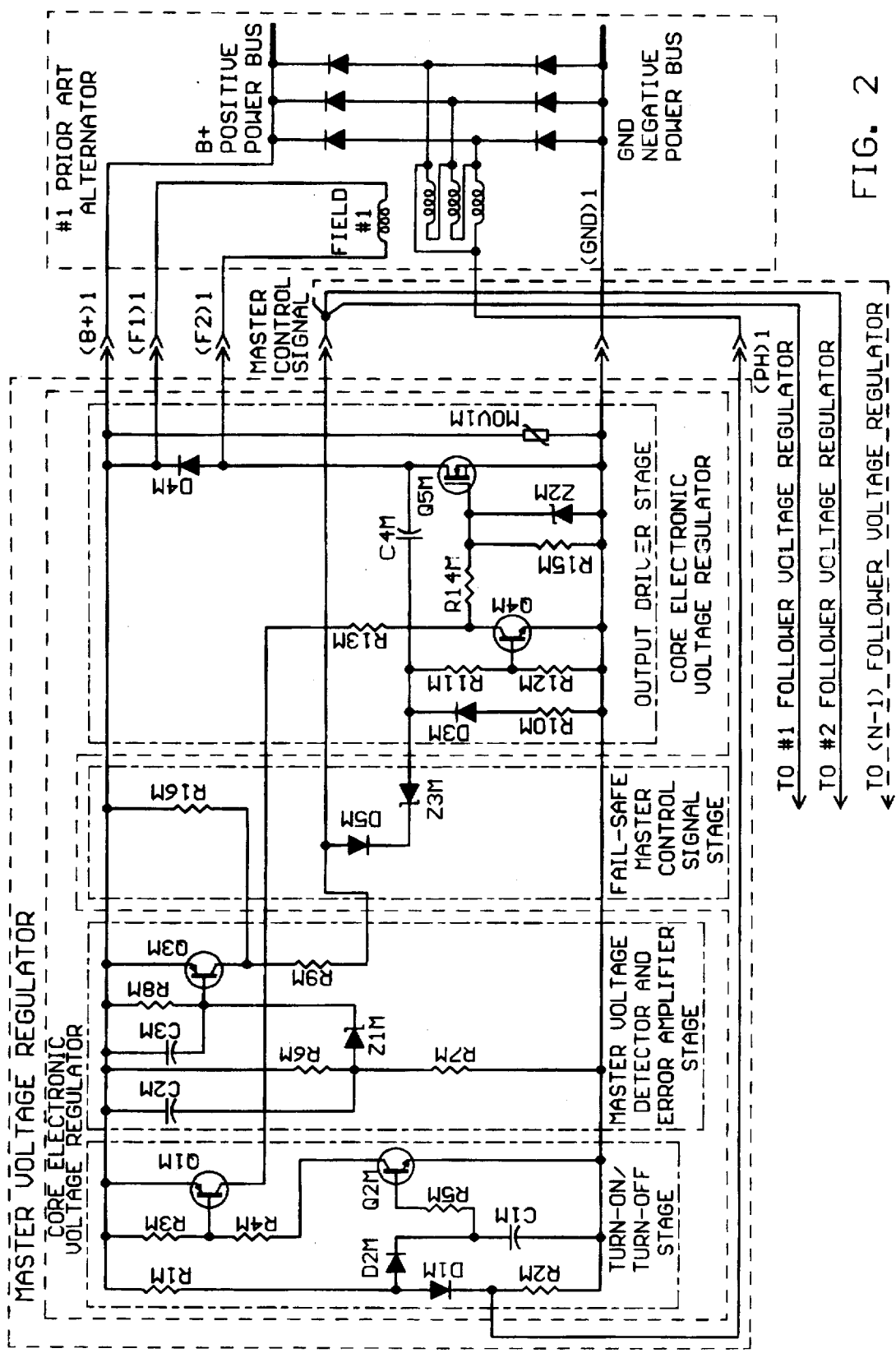
FIG. 2 is a schematic diagram of (i) the preferred first embodiment of a "core" electronic voltage regulator, modified to be used as the single, master voltage regulator with (ii) a preferred first embodiment of the fail-safe universal control signal stage and (iii) the associated prior art alternator.

2. Construction of a First Preferred Embodiment of the Single, Master Voltage Regulator FIG. 2 shows a preferred first embodiment of a master, "A"-type voltage regulator incorporating a "core" voltage regulator built according to the teachings of related patent application Ser. No. 08/645,611—which in turn is related to U.S. Pat. No. 5,325,044 and patent application Ser. No. 08/580,763—plus a first resistor R16M connected across the collector-emitter junction of a first PNP transistor Q3M used in the voltage detector and error amplifier stage.

Additionally, the series connection of a first diode D5M and a first zener diode Z3M is connected in series between a second resistor R9M and the junction of second diode D3M, third resistor R11M and first capacitor C4M. First PNP transistor Q3M, second resistor R9M, second diode D3M, third resistor R11M and first capacitor C4M are component parts of the "core" voltage regulator built according to patent application Ser. No. 08/645,611.

Finally, the master control signal is derived from the junction of series-connected second resistor R9M and first diode DSM.

2.1 Functional Description of the First Preferred Embodiment of the Single, Master Voltage Regulator A functional description of a preferred embodiment of the single, master voltage regulator is as follows:

First consider the standby condition in which the associated prior art alternator (labeled #1 in FIG. 2) is not turning and therefore, as taught in patent application Ser. No. 08/645,611, the voltage regulator is shut-off and no current flows through the field winding of the associated prior art alternator.

Now consider the case when the engine is started and the alternator begins to turn (because of the mechanical link to the engine). Under this condition, the voltage regulator will be turned on and regulation will be provided by enabling the bias path of the N-Channel, MOS power transistor Q6M.

A control signal is routinely developed by the master voltage regulator (in the voltage detector and error amplifier stage) to control its associated alternator in response to a voltage developed across the (B+)1 positive power bus and the (GND)1 negative power bus. This control signal is brought out, by hard wired connection, at the junction of series-connected second resistor R9M and first diode DSM and becomes the master control signal that will be distributed to the several, identical, follower voltage regulators.

First resistor R16M, connected across the collector-emitter junction of first PNP transistor Q3M, provides a permanent high resistance, low current source, connected to (B+)1 and available to the master control signal through series-connected second resistor R9M. The series connection of first resistor R16M, second resistor R9M, first diode D5M, first zener diode Z3M, fourth resistor R11M and fifth resistor R12M creates a voltage divider. This voltage divider establishes a positive voltage level (with respect to (GND)1) at first output "MASTER CONTROL SIGNAL", that in the absence of wired connections emanating from this first output, is equal to the sum of the voltage drops across fourth resistor R11M, fifth resistor R12M, first zener diode Z3M first diode DSM; where the voltage drop across first zener diode Z3M is by far the most important, with the following consequences (1) the voltage drop across fourth resistor R11M is small enough so that the first NPN gate-bypass transistor Q4M is unable to turn on in the absence of the master control signal, produced by the turn-on of first PNP transistor Q3M and (2) the voltage level (with respect to (GND)i) at first output "MASTER CONTROL SIGNAL", is high enough that it provides an adequate voltage bias source to operate the several (modified) turn- on/turn-off stages of the wired-connected follower voltage regulators.

It is clear from the above discussion that the voltage signal at the first output "MASTER CONTROL SIGNAL" is made up of a signal switched to (B+)1, superimposed on a ground-referenced voltage bias level.

First resistor R16M, first diode DSM and first zener diode Z3M were added to a prior art regulator (as described in patent application Ser. No. 08/645,611) to create this superposition of signals and thus implement the fail-safe turn-off function of each follower voltage regulator (as will be seen in section 3.1).

In case of a short-circuit across the field winding of the associated alternator, first diode DSM isolates the master control signal from the characteristic short-circuit voltage waveform—described in detail in U.S. Pat. No. 5,325,044 and patent application Ser. No. 08/580,763—appearing at the junction of second diode D3M, third resistor R11M and first capacitor C4M; effectively avoiding the propagation of the short-circuit waveform. This waveform, in the absence of first diode DSM, will force all follower voltage regulators to mimic a short circuit condition across the field winding of their associated alternators, effectively shutting down all power generation.

From the above discussion, it is clear that even in the event of a catastrophic failure caused by a short circuit in the field winding of the prior art alternator associated with the master voltage regulator, the output driver stage of the master voltage regulator will be isolated from the voltage detector and error amplifier stage through first diode DSM and therefore, a master control signal can still be generated by the voltage detector and error amplifier stage. The master control signal will then interact with the several, still operating follower voltage regulators, tracking the same voltage setting as before the failure and the alternators associated with the follower voltage regulators will deliver power to the common battery/load in proportion to their generating capacity at the prevalent, operating conditions.

Similarly, in case of an open condition, typically caused by an open field winding, a broken connection, broken or worn-out brushes, an open power output transistor etc., the associated pair master voltage regulator-alternator will not deliver any power to the battery/load. However, the voltage detector and error amplifier stage will still be functional and the master control signal will be transmitted by wired connection to all other, still operating follower voltage regulators which in turn will be able to control their associated alternators to deliver power to the common battery/load, tracking the same voltage setting as before the failure to an open condition.

Furthermore, in case of a short condition, typically caused by a shorted power output transistor, the associated alternator will runaway without control under a full-field condition. However, the voltage detector and error amplifier stage will still be functional and if i) the electrical load is small, only the master associated pair will be delivering power to the common battery/load or if ii) the electrical load is large, the master associated pair will deliver all the power it is capable to generate to the battery/load while the follower associated pairs will be tracking the original voltage setting and delivering power to the battery/load in proportion to their generating capacity at the prevalent, operating conditions.

Finally, in case the prior art alternator associated with the master voltage regulator comes to a standstill, typically because of broken drive belts, the turn-on/turn-off stage will become disabled and will therefore shut off the field winding of the associated alternator, avoiding potential thermal damage caused by current flowing through a winding that at standstill would have no means of cooling itself. However, the voltage detector and error amplifier stage will still be functional and the master control signal will be distributed to all other, operating follower voltage regulators, which in turn will be able to control their associated alternators to deliver power to the common battery/load, tracking the original voltage setting as before the belt breakage.

It is clear from the above discussion that the master control signal derived from the voltage detector and error amplifier stage of the master voltage regulator has the remarkable property of confining a failure in the master associated pair only to that pair, isolating the cause of failure and compensating for its consequences. The voltage detector and error amplifier stage itself is an extremely rugged electronic circuit that inherently adds a minuscule failure mechanism to the overall master voltage regulator circuit. Thus, the failure-isolation-and-compensation features of the master voltage regulator will be implemented with extreme reliability.

Figure 3:
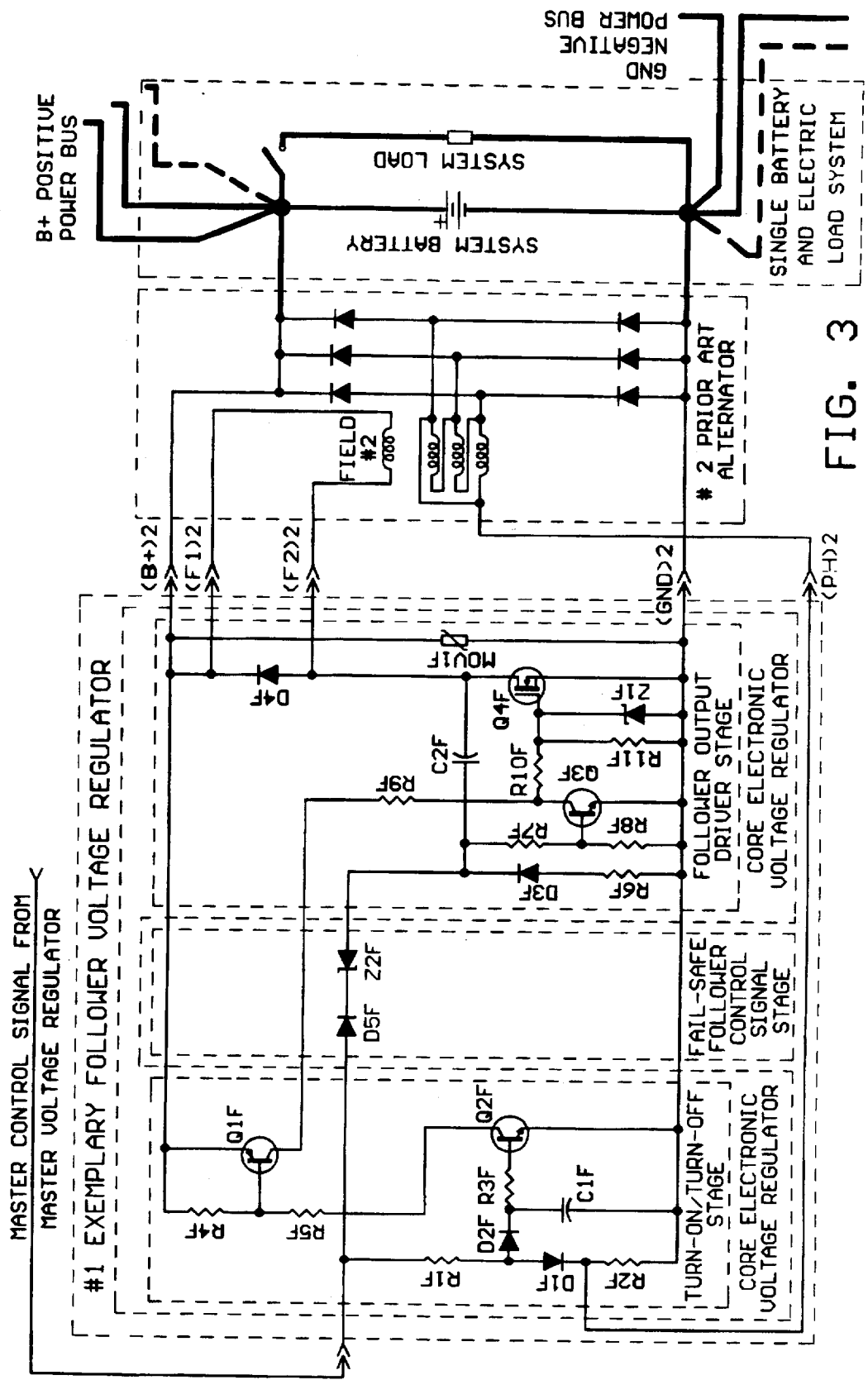
FIG. 3 is a schematic diagram of (i) the preferred first embodiment of a "core" electronic voltage regulator, modified to be used as any of the several, identical, follower voltage regulator with (ii) a preferred first embodiment of the fail-safe follower control signal stage with (iii) the associated prior art alternator and (iv) the single, common battery/load.

3. Construction of a First Preferred Embodiment of the Follower Voltage Regulator FIG. 3 shows a preferred embodiment of an exemplary—in this case labeled #1—"A"-type, N-Channel MOS output power transistor, follower voltage regulator incorporating a "core" voltage regulator built according to related patent application Ser. No. 08/645,611—which in turn is related to U.S. Pat. No. 5,325,044 and patent application Ser. No. 08/580,763—minus the entire voltage detector and error amplifier stage, plus the series connection of first diode DSF and first zener diode Z2F, connected between first resistor R1F and the junction of second diode D3F, second resistor R7F and first capacitor C2F. First resistor R1F, second diode D3F, second resistor R7F and first capacitor C2F are component parts of the "core" voltage regulator built according to patent application Ser. No. 08/645,611.

Finally, the master control signal—from the master voltage regulator—is applied at the junction of first resistor R1F and first diode DSF.

First resistor R1F, originally connected to the (B+) positive power bus (per patent application Ser. No. 08/645,611), is now connected to the (B+) positive power bus through the series connection of resistors R9M and R16M, the latter two resistors located in the master voltage regulator.

3.1 Functional Description of the First Preferred Embodiment of the Follower Voltage Regulator A functional description of a first preferred embodiment of the several, identical, follower voltage regulators is as follows:

First consider the standby condition in which the associated prior art alternator (labeled #2 in FIG. 3) is not turning and therefore, as taught in patent application Ser. No. 08/645,611, the voltage regulator is shut-off and no current flows through the field winding of the associated alternator. It must be noted that first resistor R1F is returned to the common (B+)1 positive power bus through the series connection of resistors R9M and R16M, the latter two resistors located in the master voltage regulator. This configuration allows the turn-on/turn-off stage of the follower voltage regulator to operate properly if the ohmic values of second resistor R3F, third resistor R4F and fourth resistor R5F are adequately chosen.

Now consider the case when the engine is started and the associated alternator begins to turn (because of the mechanical link to the engine). Under this condition, the follower voltage regulator will be turned on and regulation will be provided by i) enabling the bias path of the first N-Channel MOS power transistor Q4F and by ii) transmitting the master control signal to the follower output driver stage through first diode DSF and first zener diode Z2F. A follower control signal is thus developed that operates in lock-step with the master control signal. First diode DSF isolates the follower control signal from the master control signal in case of a short-circuit across the field winding of the associated alternator, in an identical manner as was described for first diode DSM in the single, master voltage regulator.

Similarly, in case of an open condition, typically caused by an open field winding, a broken connection, broken or worn-out brushes, an open output power transistor, etc., the follower voltage regulator-alternator pair will not deliver any power to the battery/load. However, the other, operating follower pair(s) and/or the single master pair will continue delivering power to the battery/load, tracking the same voltage setting as before the failure to an open condition.

Furthermore, in case of a failure to short condition, typically caused by a shorted output transistor, the associated alternator will runaway without control under a full-field condition, similarly to that described in section 2.1 for the single, master voltage regulator.

Still furthermore, in case the prior art alternator associated with the follower voltage regulator comes to a standstill, typically because of broken drive belts, the turn-on/turn-off stage will become disabled and will therefore turn off the field winding of the associated alternator, similarly to what was described in section 2.1 for the single, master voltage regulator.

Finally, if the wire that conducts the master control signal from the master to the follower voltage regulators becomes interrupted because of a loose, corroded or broken connection, then, the first R1F resistor becomes disconnected from the positive voltage bias source described in section 2.1, thus disabling the turn-on/turn-off stage of the follower voltage regulator which consequently turns off the field winding of its associated alternator, thus implementing a fail-safe function on the follower pair upon interruption of the master control signal. The series connection of first diode DSF, first zener diode Z2F, second resistor R7F and third resistor R8F plus resistors R9M and R16M (the latter two resident in the master voltage regulator), create a voltage divider similar to the one described in section 2.1. First diode DSF, first zener diode Z2F, second resistor R7F and third resistor RSF establish a voltage bias level (with respect to (GND)2 in FIG. 3) similar to the one described in section 2.1.

It is clear from the above discussion that the follower control signal (derived from the master control signal) has the remarkable property of confining a failure in the follower associated pair only to that pair, isolating the cause of failure.

The preferred components, and components values, for all circuit embodiments are given in the following table. All components with an identification ending in "M" are shown within FIG. 2; with an identification ending in "F" within FIG. 3.

| COMPONENT | VALUE |
| --- | --- |
| R9M | 1.2, ¼ watt carbon film resistor |
| R11M | 22 kilohm, ¼ watt carbon film resistor |
| R12M | 22 kilohm, ¼ watt carbon film resistor |
| R16M | 390 kilohm, ¼ watt carbon film resistor |
| D5M | Silicon diode, type 1N4148 or equivalent |
| Z3M | Zener diode, 8.2 volt, ½ watt, 5%, type 1N756A or equivalent |
| R1F | 680 kilohm, ¼ watt carbon film resistor |
| R2F | 560 ohm, ½ watt carbon film resistor |
| R3F | 150 kilohm, ¼ watt carbon film resistor |
| R4F | 5.6 kilohm, ¼ watt carbon film resistor |
| R5F | 39 kilohm, ¼ watt carbon film resistor |
| R7F | 22 kilohm, ¼ watt carbon film resistor |
| R8F | 22 kilohm, ¼ watt carbon film resistor |
| D5F | Silicon diode, type 1N4148 or equivalent |
| Z2F | Zener diode, 8.2 volt, ½ watt, 5%, type 1N756A or equivalent |

In accordance with the preceding explanation, certain variations and adaptations of the fail-safe common control of multiple alternators connected in electrical tandem parallel each by an individually associated voltage regulator, one of which voltage regulators is a master, controlling by wire all other identical voltage regulators as followers in accordance with the present invention, will suggest themselves to a practitioner of the electronic circuit design arts.

In accordance with these and other possible variations and adaptations of the present invention, the scope of the invention should be determined in accordance with the following claims, and not solely in accordance with those embodiments within which the invention has been taught.

What is claimed is:

1. A power system for producing electrical power from a source of motive power comprising:
   a battery;
   a plurality of alternators connected in electrical parallel across the battery, each alternator being individually responsive to an individually associated regulating signal to produce electrical power from the source of motive power; and
   a plurality of electronic voltage regulators including
      a master electronic voltage regulator for producing a control signal in response to variations in a voltage across the battery, and for providing in response to this control signal a regulating signal to an associated one of the plurality of alternators, and
      at least one follower voltage regulator, receiving the control signal, for providing in response to this control signal a regulating signal to an individually associated one of the plurality of alternators.

2. The power system according to claim 1 suitable for use on a vehicle wherein the battery comprises:
   a vehicular battery; wherein the plurality of alternators comprise:
   vehicular alternators; and wherein the plurality of electronic voltage regulators comprise:
   vehicular electronic voltage regulators.

3. The power system according to claim 1 wherein each of the plurality of voltage regulators is producing an associated pulse width modulated regulating signal.

4. The power system according to claim 1 wherein the at least one follower voltage regulator of the plurality of voltage regulators comprises:
   a circuit means for protecting the at least one follower voltage regulator of the plurality of voltage regulators against induced failure due to loss of the control signal from the master voltage regulator.

5. The power system according to claim 1 that is fail-safe against outage in that failure in any one of the plurality of alternators, which failure causes an outage wherein no associated electrical power is produced, is insufficient to cause an outage of the entire power system, the power system suffering only a reduced overall power generation capacity.

6. The power system according to claim 1 that is fail-safe against outage in that failure in any one of the plurality of electronic voltage regulators, which failure causes an outage wherein no electrical power is produced by an associated alternator, is insufficient to cause an outage of the entire power system, the power system suffering only a reduced overall power generation capacity.

7. The power system according to claim 1 that is fail-safe against outage in that failure in any one electronic voltage regulator or any one alternator of the combined pluralities of both alternators and of electronic voltage regulators, which failure causes an outage wherein no electrical power is produced by an alternator of a voltage-regulator-and-alternator pair whereat failure has occurred, is insufficient to cause an outage of the entire power system, the power system suffering only a reduced overall power generation capacity.

8. The power system according to claim 1 that is fail-safe against runaway in that failure in any one of the plurality of alternators, which failure causes a runaway wherein maximum electrical power is produced by failed alternator regardless of conditions, is insufficient to cause a runaway of the entire power system, the entire power system suffering runaway only in the electrical power produced by the failed one, only, of its plurality of alternators and not by all other ones of its plurality of alternators.

9. The power system according to claim 1 that is fail-safe against runaway in that failure in any one of the plurality of electronic voltage regulators, which failure causes a runaway wherein maximum electrical power is produced by the alternator associated with the failed electronic voltage regulator regardless of conditions, is insufficient to cause a runaway of the entire power system, the entire power system suffering runaway only in the electrical power produced by the one, only, of its plurality of alternators that is associated with the failed electronic voltage regulator, and not by all other ones of its plurality of alternators.

10. The power system according to claim 1 that is fail-safe against runaway in that failure in any one electronic voltage regulator or any one alternator of the combined pluralities of both alternators and of electronic voltage regulators, which failure causes a runaway wherein maximum electrical power is produced by one of the plurality of alternators regardless of conditions, is insufficient to cause a runaway of the entire power system, the entire power system suffering runaway only in the electrical power produced by one only of its plurality of alternators, and not by all other ones of its plurality of alternators.

11. The power system according to claim 1 that is fail-safe against both (i) outage and (ii) runaway in that failure in any one of the combined pluralities of alternators and of electronic voltage regulators, which failure causes either (i) an outage wherein no electrical power is produced by an associated voltage regulator and alternator pair, or else (ii) a runaway wherein maximum associated electrical power is produced by an associated voltage regulator and alternator pair regardless of conditions, is insufficient to, respectively, cause either (i) an outage, or else (ii) a runaway, of the entire power system, the power system suffering, respectively, either only (i) reduced power generation capacity in the overall system, or (ii) runaway in one only of its plurality of alternators.

12. The power system according to claim 1 that is fail-safe against standstill of any one of the plurality of alternators, which standstill is commonly associated with lack of motive drive of the alternator, the entire power system suffering in the event of such standstill only a reduced overall power generation capacity.

13. A method of operating a plurality of electrical alternators to collectively produce more electrical power than would one alternator, the method comprising:

first electrically connecting the plurality of electrical alternators in parallel across a load;

sensing the voltage appearing across the load;

producing, in response to the sensed voltage in a first circuit portion of a master electronic voltage regulator, a master control signal;

first electronically regulating, in response to the master control signal in and by a second circuit portion of the master electronic voltage regulator, an associated first one of the plurality of electrical alternators;

first generating, in the associated first one of the plurality of electrical alternators in response to the first electronically regulating, electrical power into the load;

second electrically connecting the master control signal from the master electronic voltage regulator to at least one other, follower, electronic voltage regulator:

second electronically regulating, in response to the master control signal in and by the at least one other, follower, electronic voltage regulator, an associated second one of the plurality of electrical alternators; and second generating, in the associated second one of the plurality of electrical alternators in response to the second electronically regulating, electrical power into the load;

wherein the combined first and second electronically regulating is so as to cause that each of the first generating and the second generating is in accordance with individual capacities of the first, and of the second, of the ones of the plurality of electrical alternators.

14. The method according to claim 13 wherein the first electronically regulating is fail-safe in respect of at least one of the first generating, meaning that the first electronically regulating continues even should, by failure or by lack of motive drive or otherwise, the first one of the plurality of electrical alternators fail to produce electrical power into the load, the second electronically regulating, meaning that the first electronically regulating continues even should, by failure or otherwise, the follower electronic voltage regulator fail in its second electronically regulating of the associated second one of the plurality of electrical alternators, and the second generating, meaning that the first electronically regulating continues even should, by failure or by lack of motive drive or otherwise, the second one of the plurality of electrical alternators fails to produce electrical power into the load.

15. The method according to claim 14 wherein the first electronically regulating is fail-safe in respect of each of the first generating, the second electronically regulating, and the second generating.

16. The method according to claim 13 wherein the first generating is fail-safe in respect of at least one of the second electronically regulating, meaning that the first generating continues even should, by failure or otherwise, the follower electronic voltage regulator fail in its second electronically regulating of the associated second one of the plurality of electrical alternators, and the second generating, meaning that the first generating continues even should, by failure or by lack of motive drive or otherwise, the second one of the plurality of electrical alternators fails to produce electrical power into the load.

17. The method according to claim 16 wherein the first generating is fail-safe in respect of each of the second electronically regulating and the second generating.

18. The method according to claim 13 wherein the second electronically regulating is fail-safe in respect of at least one of the first electronically regulating, meaning that the second electronically regulating continues even should, by failure or otherwise, the master electronic voltage regulator fails in its first electronically regulating of the associated first one of the plurality of electrical alternators, and the first generating, meaning that the second electronically regulating continues even should, by failure or by lack of motive drive or otherwise, the first one of the plurality of electrical alternators fails to produce electrical power into the load, the second generating, meaning that the second electronically regulating continues even should, by failure or by

21 lack of motive drive or otherwise, the second one of the plurality of electrical alternators fails to produce electrical power into the load.

19. The method according to claim 18 wherein the second electronically regulating is fail-safe in respect of each of the first electronically regulating, the first generating, and the second generating.

20. The method according to claim 13 wherein the second generating is fail-safe in respect of at least one of the first electronically regulating, meaning that the second generating continues even should, by failure or otherwise, the master electronic voltage regulator fail in its first electronically regulating of the associated first one of the plurality of electrical alternators, and the first generating, meaning that the second generating continues even should, by failure or by lack of motive drive or otherwise, the first one of the plurality of electrical alternators fails to produce electrical power into the load.

21. The method according to claim 20 wherein the second generating is fail-safe in respect of each of the first electronically regulating and the first generating.

22. An alternator-outage fail-safe power system for producing electrical power from a source of motive power comprising:

a plurality of alternators, each individually responsive to an associated regulating control signal to independently produce electrical power from the source of motive power, wherein all the plurality of alternators are connected in electrical parallel; and regulation means, responsive to a common voltage produced by all the electrically-parallel-connected plurality of alternators, for producing a plurality of regulating control signals as are each individually suitable and used for individually controlling a corresponding associated one of the plurality of alternators;

wherein each of said plurality of regulating control signals is produced independently, and fail-safe, of any outage failure in any one of the plurality of alternators, which failure causes an outage wherein no associated electrical power is produced;

wherein an outage failure in any one of the plurality of alternators is insufficient to cause an outage of the entire power system, the power system suffering only a reduced overall power generation capacity.

23. The alternator-outage fail-safe power system according to claim 22 wherein each of said plurality of regulating control signals is further produced independently, and fail-safe, of any runaway failure in any one of the plurality of alternators, which failure causes a runaway where maximum electrical power is produced regardless of conditions;

wherein a runaway failure in any one of the plurality of alternators is insufficient to cause a runaway of the entire power system, the power system suffering runaway only in the electrical power produced by a failed one, only, of its plurality of alternators and not by all other ones of its plurality of alternators;

wherein the alternator-outage fail-safe power system is extended so as to further be fail-safe against alternator runaway, and is thus an alternator-outage alternator-runaway fail-safe power system.

24. The alternator-outage alternator-runaway fail-safe power system according to claim 23 wherein the regulation means comprises:

22 a plurality of electronic voltage regulators including a master electronic voltage regulator for producing a universal control signal in response to variations in the common voltage, and for providing in response to this universal control signal a first regulating control signal to an associated one of the plurality of alternators, and at least one follower voltage regulator, receiving the universal control signal from the master electronic voltage regulator, for producing in response to this universal control signal a regulating control signal for an individually associated one of the plurality of alternators.

25. The alternator-outage alternator-runaway fail-safe power system according to claim 24 wherein the collective plurality of electronic voltage regulators are fail-safe against any failure in any one electronic voltage regulator as does cause an outage wherein no electrical power is produced by an associated alternator, the failure of any one of the plurality of electronic voltage regulators being insufficient to cause an outage of the entire power system, the power system suffering only a reduced overall power capacity.

wherein the alternator-outage alternator-runaway fail-safe power system is extended so as to further be fail-safe against electronic voltage regulator failure as causes associated alternator outage, and is thus an alternator-outage alternator-runaway electronic-voltage-regulator-failure-as-causes-associated-alternator-outage fail-safe power system.

26. The alternator-outage alternator-runaway electronic-voltage-regulator-failure-as-causes-associated alternator-outage fail-safe power system according to claim 25 wherein the collective plurality of electronic voltage regulators are fail-safe against any failure in any one electronic voltage regulator as does cause a runaway where maximum electrical power is produced by an associated alternator, the failure of any one of the plurality of electronic voltage regulators being insufficient to cause a runaway of the entire power system, the power system suffering runaway only in the electrical power produced by the one, only, of its plurality of alternators that is associated with the failed electronic voltage regulator, and not by all other ones of its plurality of alternators;

wherein the alternator-outage alternator-runaway electronic-voltage-regulator-failure-as-causes-associated-alternator-outage fail-safe power system is extended so as to further be fail-safe against electronic voltage regulator failure as causes associated alternator runaway, and is thus an alternator-outage alternator-runaway electronic-voltage-regulator-failure-as-causes-associated-alternator-outage electronic-voltage-regulator-failure-as-causes-associated-alternator-runaway fail-safe power system.

27. The alternator-outage alternator-runaway electronic-voltage-regulator-failure-as-causes-associated-alternator-outage and electronic-voltage-regulator-failure-as-causes-associated-alternator-runaway fail-safe power system according to claim 26 wherein the collective plurality of electronic voltage regulators are fail-safe against standstill of any one of the plurality of alternators, which 'standstill is commonly associated with lack of motive drive of the alternator, the power system suffering in the event of such standstill only a reduced overall power generation capacity;

wherein alternator-outage alternator-runaway electronic-voltage-regulator-failure-as-causes-associated-alternator-outage and electronic-voltage-regulator-failure-as-causes-associated-alternator-runaway fail-safe power system is extended so as to further be fail-safe against alternator standstill, and is thus an alternator-outage alternator-runaway electronic-voltage-regulator-failure-as-causes-associated-alternator-outage electronic-voltage-regulator-failure-as-causes-associated-alternator-runaway alternator-standstill fail-safe power system.

28. The alternator-outage alternator-runaway electronic-voltage-regulator-failure-as-causes-associated-alternator-outage electronic-voltage-regulator-failure-as-causes-associated-alternator-runaway alternator-standstill fail-safe power system according to claim 27 suitable for use on a vehicle further comprising:

a battery in electrical parallel with the parallel-connected plurality of alternators;

and wherein the plurality of alternators comprise:

vehicular alternators;

and wherein the plurality of electronic voltage regulators comprise:

vehicular electronic voltage regulators.

29. The power system according to claim 24 wherein each of the plurality of voltage regulators is producing an associated pulse width modulated control signal.

30. The power system according to claim 24 wherein the at least one follower voltage regulator of the plurality of voltage regulators comprises:

a circuit means for protecting the at least one follower voltage regulator of the plurality of voltage regulators against induced failure due to loss of the universal control signal from the master voltage regulator.

* * * * *